(12) United States Patent
Daniel et al.

(10) Patent No.: US 9,104,195 B2
(45) Date of Patent: Aug. 11, 2015

(54) WELDING JOB SEQUENCER

(75) Inventors: Joseph A Daniel, Sagamore Hills, OH (US); Dmitry Brant, Mayfield Heights, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 1276 days.

(21) Appl. No.: 11/613,652

(22) Filed: Dec. 20, 2006

(65) Prior Publication Data

US 2008/0149686 A1   Jun. 26, 2008

(51) Int. Cl.
  *B23K 9/10* (2006.01)
  *G05B 19/418* (2006.01)

(52) U.S. Cl.
  CPC *G05B 19/41865* (2013.01); *G05B 2219/32001* (2013.01); *G05B 2219/32007* (2013.01); *G05B 2219/45135* (2013.01)

(58) Field of Classification Search
  USPC .............................. 219/130.01, 130.5, 137.7
  See application file for complete search history.

(56) References Cited

U.S. PATENT DOCUMENTS

| | | | |
|---|---|---|---|
| 3,581,051 A | 5/1971 | Brown et al. | |
| 3,689,734 A | 9/1972 | Burley et al. | |
| 4,390,954 A | 6/1983 | Manning | |
| 4,419,560 A * | 12/1983 | Zurek | 219/117.1 |
| 4,477,713 A * | 10/1984 | Cook et al. | 219/124.34 |
| 5,206,474 A | 4/1993 | Fukuoka et al. | |
| 5,278,390 A | 1/1994 | Blankenship | |
| 5,773,779 A | 6/1998 | Morlock | |
| 5,859,847 A * | 1/1999 | Dew et al. | 370/389 |
| 5,877,468 A | 3/1999 | Morlock | |
| 6,023,044 A | 2/2000 | Kosaka et al. | |
| 6,087,627 A | 7/2000 | Kramer | |
| 6,115,273 A | 9/2000 | Geissler | |
| 6,133,545 A | 10/2000 | Okazaki et al. | |
| 6,151,640 A | 11/2000 | Buda et al. | |
| 6,278,074 B1 | 8/2001 | Morlock | |
| 6,292,715 B1 | 9/2001 | Rongo | |
| 6,399,912 B1 * | 6/2002 | Steenis et al. | 219/73.2 |
| 6,492,618 B1 * | 12/2002 | Flood et al. | 219/125.11 |
| 6,583,386 B1 | 6/2003 | Ivkovich | |
| 6,624,388 B1 * | 9/2003 | Blankenship et al. | 219/130.5 |
| 6,700,097 B1 | 3/2004 | Hsu et al. | |
| 6,717,108 B2 | 4/2004 | Hsu | |
| 6,734,394 B2 | 5/2004 | Hsu | |
| 6,747,247 B2 | 6/2004 | Holverson et al. | |

(Continued)

FOREIGN PATENT DOCUMENTS

| | | |
|---|---|---|
| CN | 1370654 A | 9/2002 |
| CN | 1469791 A | 1/2004 |

OTHER PUBLICATIONS

International Search Report; PCT/US07/15014; Mar. 11, 2008.

(Continued)

*Primary Examiner* — Dana Ross
*Assistant Examiner* — Ayub Maye
(74) *Attorney, Agent, or Firm* — Perkins Coie LLP

(57) ABSTRACT

A semi-automatic welding work cell, including a welding job sequencer that automatically selects a welding schedule for use by an operator in the semi-automatic welding work cell. The automatic selection may be by way of elapsed time, a detection of welding operations, a detection of the amount of welding wire supplied for the welding operation, or a detection of the amount of energy supplied for the welding operation.

20 Claims, 2 Drawing Sheets

(56) References Cited

U.S. PATENT DOCUMENTS

| | | | |
|---|---|---|---|
| 6,847,956 B2* | 1/2005 | Manicke et al. | 706/47 |
| 6,924,459 B2 | 8/2005 | Spear et al. | |
| 6,930,280 B2 | 8/2005 | Zauner et al. | |
| 7,102,098 B2* | 9/2006 | Rouault et al. | 219/130.5 |
| 8,115,138 B2* | 2/2012 | Jacovetty et al. | 219/130.5 |
| 8,592,723 B2* | 11/2013 | Davidson et al. | 219/130.5 |
| 2002/0117487 A1 | 8/2002 | Corby, Jr. et al. | |
| 2004/0122550 A1* | 6/2004 | Klimko et al. | 700/212 |
| 2004/0232128 A1* | 11/2004 | Niedereder et al. | 219/130.5 |
| 2005/0127052 A1 | 6/2005 | Spencer | |
| 2005/0149210 A1* | 7/2005 | Britton | 700/51 |
| 2006/0178778 A1* | 8/2006 | Fuhlbrigge et al. | 700/264 |
| 2006/0207980 A1* | 9/2006 | Jacovetty et al. | 219/130.5 |
| 2007/0056942 A1* | 3/2007 | Daniel et al. | 219/125.1 |
| 2007/0198105 A1* | 8/2007 | Britton | 700/51 |

OTHER PUBLICATIONS

"Interim Guidance for Determining Subject Matter Eligibility for Process Claims in View of *Bilski* v. *Kappos*," 75 Fed. Reg. 43,922-43,928 (Jul. 27, 2010) (7 pages).

IFW of (related by subject matter) U.S. Appl. No. 11/227,349, filed Sep. 15, 2005.

Written Opinion (WO) of the (ISA) mailed Mar. 11, 2008, of counterpart Int'l Application No. PCT/US07/15014.

International Preliminary Report on Patentability (IPRP) issued Jun. 6, 2009, of counterpart Int'l Application No. PCT/US07/15014.

Lincoln Welders NA-3 and NA-4, Automatic Welding Systems with Solid State Controls, brochure.

Power Feed 10M, Publication E8.266, Aug. 2004 brochure.

Power Wave 455 M & Power Wave 455 M/Stt, Publication E5.161, Aug. 2004, brochure.

NA-5 Automatic Welding System, brochure.

Wave Designer, Software for Waveform Control Technology, brochure.

Australian Patent Application No. 2007338858, Office Action, 2 pages, Aug. 13, 2010.

Canadian Patent Application No. 2,672,717, Office Action, 3 pages, Mar. 21, 2013.

Canadian Patent Application No. 2,672,717, Office Action, 5 pages, Sep. 2, 2010.

Chinese Patent Application No. 200780046777.X, Office Action, 4 pages, Jul. 3, 2012.

Chinese Patent Application No. 200780046777.X, Office Action, 4 pages, Jul. 30, 2013.

Chinese Patent Application No. 200780046777.X, Office Action, 5 pages, Feb. 1, 2013.

Chinese Patent Application No. 200780046777.X, Office Action, 5 pages, Jan. 15, 2014.

Chinese Patent Application No. 200780046777.X, Office Action, 8 pages, Aug. 14, 2014.

Chinese Patent Application No. 200780046777.X, Office Action, 8 pages, Jul. 20, 2011.

\* cited by examiner

WELDING JOB SEQUENCER

BACKGROUND OF THE INVENTION

1. Field of the Invention

Devices, systems, and methods consistent with the invention relate to semi-automatic welding work cells.

2. Description of the Related Art

In the related art, work cells are used to produce welds or welded parts. There are at least two broad categories of work cells, including robotic work cells and semi-automatic work cells.

In robotic work cells, the scheduling and performing of welding operations is largely automated, with little operator involvement. Thus, these cells generally have a relatively low labor cost and a relatively high productivity. However, their repeating operations cannot easily adapt to varying welding conditions and/or sequences.

In contrast, semi-automatic work cells (i.e., work cells involving at least some operator welding) generally provide less automation vis-à-vis robotic work cells, and accordingly have a relatively higher labor cost and a relatively lower productivity. Nevertheless, there are many instances where using a semi-automatic welding work cell can actually be advantageous over robotic work cells. For example, a semi-automatic welding work cell can more easily adapt to varying welding conditions and/or sequences.

Unfortunately, when welding more complex assemblies in related art semi-automatic work cells, multiple different welding schedules are often required for different types of welds on different parts of an assembly. In many systems, when a different welding schedule must be utilized, the operator is required to stop welding operations and manually adjust the output of the semi-automatic equipment according to the new schedule. In some other systems, this manual adjustment is eliminated by storing particular schedules in the work cell. Nevertheless, even in such systems, the operator still needs to cease welding operations and push a button to select the new welding schedule before he may continue welding.

Neither of these practices for setting a different welding schedule is particularly efficient. Thus, in practice, the number of welding schedules used in a semi-automatic work cell is often reduced in order to eliminate the need for constant adjustment of the output of the semi-automatic equipment. While this reduction of welding schedules makes the overall operation easier for the welder, the forced simplification of this approach can lead to reduced productivity and lower overall quality.

Additionally, when abiding by strict quality control specifications, it is sometimes necessary to perform welds in a specific sequence, verify that each weld is performed with a given set of conditions, and monitor the output of the equipment during the welding operations. In a robotic work cell, these requirements are easily fulfilled. However, in a semi-automatic work cell, these requirements are susceptible to human error, since the operator must keep track of all of these aspects in addition to performing the welding operations themselves.

An illustrative example of the above problems is shown in the related art semi-automatic welding method diagrammatically represented in FIG. 1. In this method, each of the various scheduling, sequencing, inspection and welding operations are organized and performed by the operator (i.e., the welder) himself. Specifically, the operator begins the welding job at operation 10. Then, the operator sets up the welding equipment according to schedule A, at operation 20. Next, the operator performs weld #1, weld #2, and weld #3 using welding schedule A at operations 22, 24 and 26. Then, the operator stops welding operations and sets up the welding equipment according to schedule B at operation 30. Next, the operator performs weld #4 using welding schedule B at operation 32. Then, the operator checks the dimensions of the assembly at operation 40, and sets up the welding equipment according to schedule C at operation 50. Next, the operator performs weld #5 and weld #6 using welding schedule C at operations 52 and 54. After the welding operations are completed, the operator visually inspects the welded assembly at operation 60, and completes the welding job at operation 70.

Clearly, the method shown in FIG. 1 depends on the operator to correctly follow the predefined sequencing for performing welds and inspections, to accurately change between welding schedules (such as at operation 30), and to perform the welding itself. Errors in any of these responsibilities can result either in rework (if the errors are caught during inspection at operation 60) or a defective part being supplied to the end user. Further, this exemplary semi-automatic welding method hampers productivity, because the operator must spend time configuring and reconfiguring weld schedules.

The above problems demand an improvement in the related art system.

BRIEF SUMMARY OF THE INVENTION

According to an aspect of the invention, there is provided a semi-automatic welding work cell including a welding job sequencer that automatically selects a welding schedule for use by an operator in the semi-automatic welding work cell.

According to another aspect of the invention, there is provided a method of welding in a semi-automatic work cell, including automatically selecting a welding schedule for use by an operator in the semi-automatic welding work cell.

According to another aspect of the invention, there is provided a welding production line including at least one semi-automatic welding work cell, where the semi-automatic work cell includes a welding job sequencer that automatically selects a welding schedule for use by an operator therein.

According to another aspect of the invention, there is provided a method of monitoring a welding production line, including automatically selecting a welding schedule for use by an operator in a semi-automatic welding work cell.

The above stated aspect, as well as other aspects, features and advantages of the invention will become clear to those skilled in the art upon review of the following description.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION OF EXEMPLARY EMBODIMENTS

Figure 1:
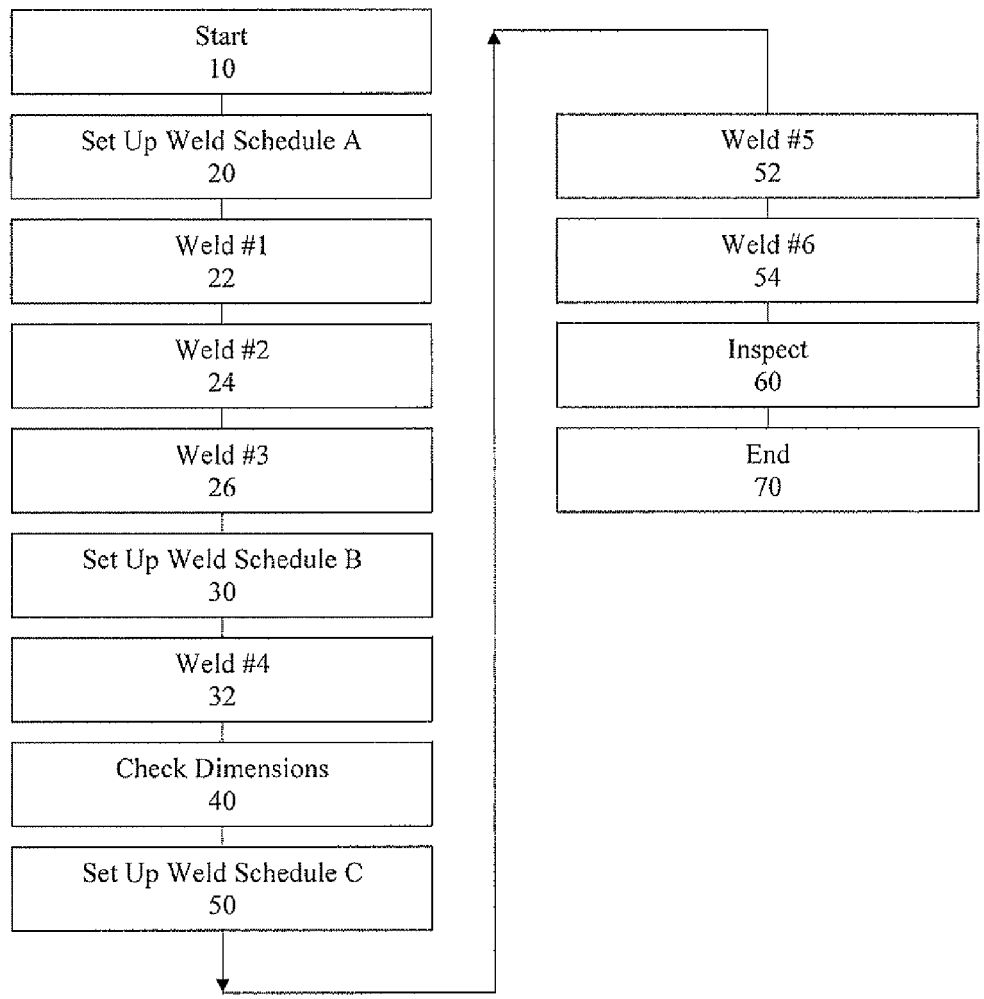
FIG. 1 illustrates a welding operation of the related art utilizing a semi-automatic welding work cell.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

In an exemplary embodiment of the invention, a welding job sequencer is provided. The welding job sequencer improves the semi-automatic work cell of the related art by increasing the productivity of the semi-automatic work cell without compromising the number of weld schedules usable therein. The welding job sequencer accomplishes this improvement by implementing automatic changes in the semi-automatic work cell, and by providing the operator with an array of commands and instructions.

More specifically, in an exemplary embodiment, the welding job sequencer automatically selects and implements a function of the welding work cell. An example of such a function includes a particular weld schedule to be used with the semi-automatic work cell. In other words, the welding job sequencer may select a weld schedule to be used for a particular weld, and modify the settings of the semi-automatic work cell in accordance with the selected weld schedule, automatically for the operator (i.e., without the operator's specific intervention).

Additionally, in the exemplary embodiment, the welding job sequencer may automatically indicate a sequence of operations that the operator should follow to create a final welded assembly. In conjunction with the automatic selection of welding schedules, this indicated sequence allows an operator to follow the sequence to create a final welded part, without having to spend time adjusting, selecting, or reviewing each individual weld schedule and/or sequence.

Accordingly, since the welding job sequencer sets up the welding equipment and organizes the workflow, and since the operator only performs the welding operations themselves, the chance for error in the welding operation is greatly reduced, and productivity and quality are improved.

Figure 2:
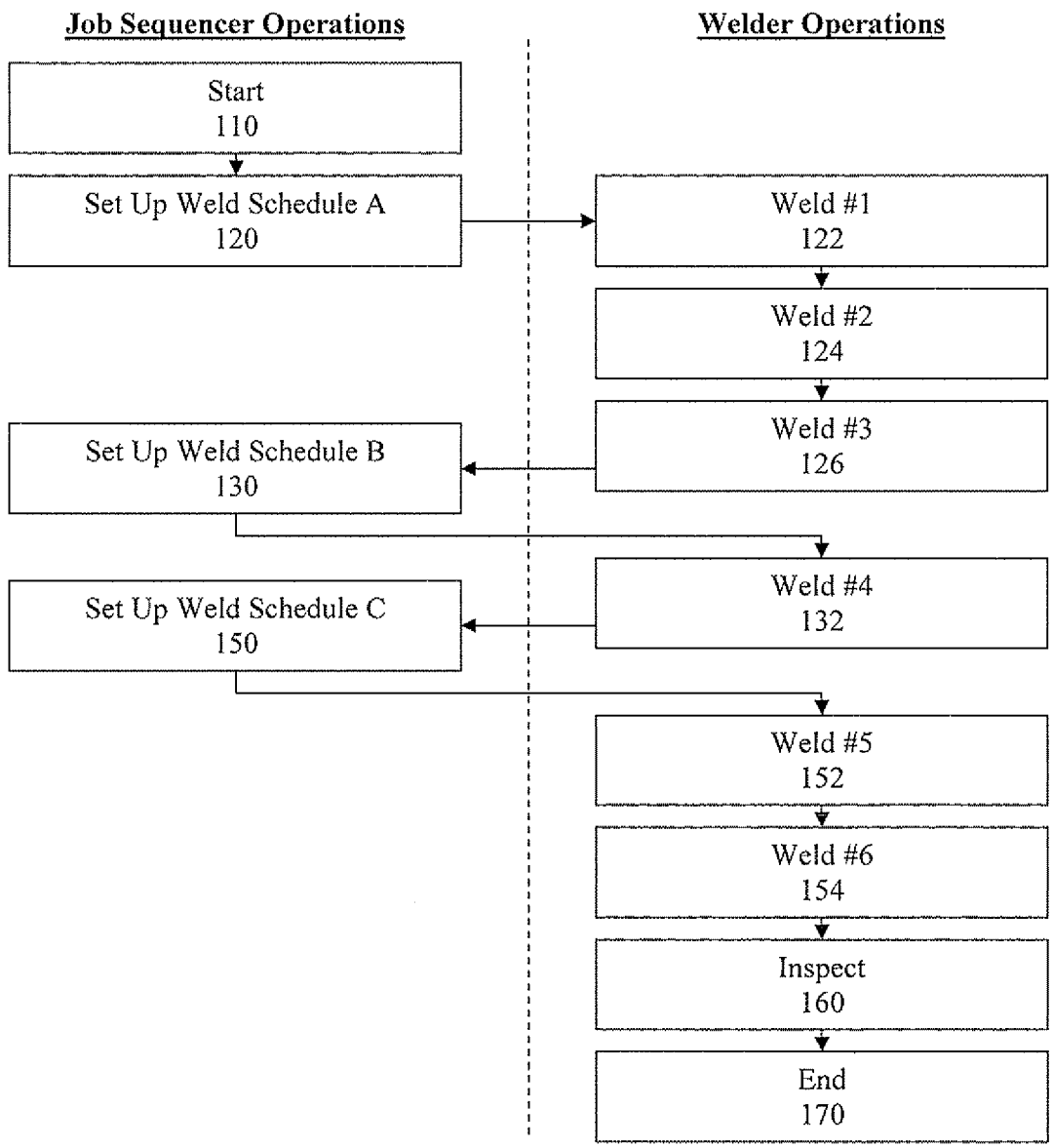
FIG. 2 illustrates a welding operation according to the invention utilizing a semi-automatic welding work cell.

The exemplary embodiment is diagrammatically represented in FIG. 2. In FIG. 2, at operation 110, the welding job sequencer begins operation, and immediately sets the welding equipment to use weld schedule A (operation 120) and instructs the operator to perform welds #1, #2 and #3. Then, the operator performs welds #1, #2 and #3 using weld schedule A (operations 122, 124 and 126). Next the welding job sequencer sets the welding equipment to use weld schedule B (operation 130), and instructs the operator to perform weld #4. Then the operator performs weld #4 using weld schedule B (operations 132). After completion of weld schedule B, the welding job sequencer sets the welding equipment to use weld schedule C (operation 150), and instructs the operator to perform welds #5 and #6, and to inspect the part. Then, the operator performs welds #5 and #6 (operations 152, and 154) using weld schedule C, and inspects the completed part to confirm that it is correct (operation 160). This inspection may include dimensional verification, visual defect confirmation, or any other type of check that might be needed. Further, operation 160 may include a requirement that the operator affirmatively indicate that the inspection is complete, such as by pressing an "OK" button, before it is possible to proceed to the next operation. Lastly, the welding job sequencer indicates that the welding operation is at an end (operation 170), and re-sets for the next operation.

Accordingly, as noted above, the sequencing and scheduling of welding operations is completed by the sequencer, and frees the operator to focus on performing welds according to instruction.

The welding job sequencer may select and implement a new function, such as the selection and implementation of weld schedules A, B and C shown in FIG. 2, based upon various variables or inputs. For example, the welding job sequencer may simply select new weld schedules based upon a monitoring of elapsed time since the beginning of the welding operations, or since the cessation of welding (such as the time after weld #3 in FIG. 2 above). Alternatively, the welding job sequencer may monitor the actions of the operator, compare the actions to the identified sequence of welds, and select new weld schedules appropriately. Still further, various combinations of these methods, or any other effective method, may be implemented, as long as the end effect is to provide an automatic selection and implementation of a function, such as the weld schedule, for use by the operator.

Parameters of the selected weld schedule may include such variables as welding process, wire type, wire size, WFS, volts, trim, which wire feeder to use, or which feed head to use, but are not limited thereto.

While the above description focuses on the selection of a weld schedule as a function which is automatically selected and implemented, the welding job sequencer is not limited to using only this function.

For example, another possible function that may be selected and implemented by the welding job sequencer is a selection of one of multiple wire feeders on a single power source in accordance with the weld schedule. This function provides an even greater variability in welding jobs capable of being performed by the operator in the semi-automatic work cell, since different wire feeders can provide a great variance of, for example, wire sizes and types.

Another example of a function compatible with the welding job sequencer is a Quality Check function. This function performs a quality check of the weld (either during welding or after the weld is completed) before allowing the job sequence to continue. The quality check can monitor various welding parameters and can pause the welding operation and alert the operator if an abnormality is detected. An example of a welding parameter measurable by this function would be arc data.

Another example of such a function would be a Repeat function. This function would instruct the operator to repeat a particular weld or weld sequence. An example of the use of this function includes when the Quality Check function shows an abnormality, or when multiple instances of the same weld are required.

Another example of such a function would be a Notify Welder function, which communicates information to the welder. This function would display information, give an audible signal, or communicate with the welder by some other means. Examples of use of this function include an indication to the operator that he is free to begin welding, or an indication that the operator should check some portion of the welded part for quality purposes.

Another example of such a function would be a Enter Job Information function. This function will require the welder to enter information, such as the part serial number, a personal ID number, or other special conditions before the job sequencer can continue. This information could also be read from a part or inventory tag itself through RFID, bar code scanning, or the like. The welding job sequencer could then utilize the entered information for the welding operations. An example of the use of this function would be as a predicate to the entire welding operation, so as to indicate to the welding job sequencer which schedules and/or sequences should be selected.

A further example of such a function would be a Job Report function. This function will create a report on the welding job, which could include information such as: the number of welds performed, total and individual arc timing, sequence interruptions, errors, faults, wire usage, arc data, and the like.

An example of the use of this function would be to report to a manufacturing quality department on the efficiency and quality of the welding processes.

A still further example of such a function would be a System Check function. This function will establish whether the welding job can continue, and could monitor such parameters as: wire supply, gas supply, time left in the shift (as compared to the required time to finish the job), and the like. The function could then determine whether the parameters indicate that there is enough time and/or material for the welding job to continue. This function would prevent downtime due to material depletion, and would prevent work-in-process assemblies from being delayed, which can lead to quality problems due to thermal and scheduling issues.

Further, as mentioned above, the welding job sequencer may select and implement a new function, based upon various variables or inputs. These variables and inputs are not particularly limited, and can even be another function. For example, another function compatible with the welding job sequencer is a Perform Welding Operation function. This function is designed to detect the actual welding performed by the operator, and to report that welding so that the welding job sequencer can determine whether to proceed with further operations. For example, this function can operate by starting when the operator pulls the trigger to start the welding operation, and finishing when the operator releases the trigger after the welding is complete, or after a predetermined period of time after it starts. This function could end when the trigger is released or it could be configured to automatically turn off after a period of time, a quantity of wire, or an amount of energy is delivered. This function may be used to determine when to select a new function, such as a new weld schedule, as discussed above.

Still further, various semi-automatic and/or robotic work cells can be integrated together on a single network, and the sequencing of welding steps at a single work-cell can be fully integrated into a complete production schedule, which itself can be modified as needed to track variations in the production schedule. Sequencing and/or scheduling information can also be stored in a database, be stored by date as archival information, and be accessed to provide various production reports.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

The invention claimed is:

1. A method of welding in a semi-automatic work cell having welding equipment and a welding job sequencer to complete an assembly defined by a plurality of welds, the plurality of welds being defined by at least two weld schedules, said method comprising:

implementing a welding equipment function with the welding job sequencer to define from the at least two weld schedules, a semi-automatic welding operation including a first weld schedule having at least one first weld set up parameter and at least one first weld instruction and a second weld schedule having at least one second weld set up parameter and at least one second weld instruction, at least one of said second weld set up parameter and said second weld instruction is different from said first weld set up parameter and said first weld instruction;

indicating to a welding operator a sequence of welding operations for completing the assembly in said semi-automatic welding operation based on said first and second weld schedules;

automatically modifying said welding equipment with the welding job sequencer in accordance with said sequence of welding operations without said welding operator intervention for completing the assembly, with said welding operator performing said semi-automatic welding operation in accordance with said sequence of welding operations based on said first and second weld schedules.

2. The method of welding in a semi-automatic work cell of claim 1, wherein said implementing to define said second weld schedule is performed after an elapsed time defined by said first weld schedule.

3. The method of welding in a semi-automatic work cell of claim 1, further comprising detecting when the operator is conducting said first weld schedule and defining said second schedule based upon that detection.

4. The method of welding in a semi-automatic work cell of claim 1, wherein said implementing to define said first and second weld schedules includes detecting an amount of welding wire supplied for the welding operation.

5. The method of welding in a semi-automatic work cell of claim 1, wherein said implementing to define said second weld schedule is according to an amount of energy supplied for the welding operation for said first weld schedule.

6. The method of welding in a semi-automatic work cell of claim 1, wherein said implementing to define at least one of the first and second weld schedules includes selecting at least one of a welding process, wire type, wire size, WFS, volts, trim, wire feeder to use, or feed head to use.

7. The method of welding in a semi-automatic work cell of claim 6, wherein said implementing to define at least one of the first and second weld schedules comprises selecting a wire feeder for use by an operator in the semi-automatic welding work cell.

8. The method of welding in a semi-automatic work cell of claim 1, further comprising monitoring quality measurables of a weld created by the operator, wherein the quality measureless comprise at least information about an arc used to form the weld created by the operator.

9. The method of welding in a semi-automatic work cell of claim 1, further comprising indicating information to the operator in the semi-automatic welding work cell.

10. The method of welding in a semi-automatic work cell of claim 1, further comprising accepting job information comprising at least a part ID number, operator ID number, or welding instructions.

11. The method of welding in a semi-automatic work cell of claim 1, further comprising producing a job report comprising at least one of a number of welds performed, total arc time, individual arc time, sequence interruptions, errors, faults, wire usage, arc data.

12. The method of welding in a semi-automatic work cell of claim 1, further comprising performing a system check comprising at least a detection of wire supply, gas supply, and time.

13. A method of monitoring a welding production line in at least one semi-automatic welding work cell for use by a welding operator in a semi-automatic welding operation to complete an assembly defined by a plurality of welds, the plurality of welds being defined by at least two weld schedules, the semi-automatic welding work cell including welding equipment and a welding job sequencer, the method comprising:

defining at least a first and a second weld schedule of said semi-automatic welding operation in a sequence of welding operations from the at least two weld schedules with the welding job sequencer, said first weld schedule having at least one first weld set up parameter and at least one first weld instruction and said second weld schedule defining at least one second weld set up parameter and at least one second weld instruction with at least one of said second weld set up parameter and said second weld instruction being different from said first weld set up parameter and said first weld instruction;

determining completion of said first weld schedule by said welding operator in said semi-automatic welding operation;

automatically modifying the welding equipment in accordance with said second weld schedule of said semi-automatic welding operation without said welding operator intervention for said welding operator to perform said semi-automatic welding operation in accordance with said sequence of welding operations; and monitoring the welding operations of said semi-automatic welding process.

14. The method of monitoring a welding production line of claim 13, wherein automatically modifying the welding equipment in accordance with said second weld schedule is based on said completion of said first weld schedule.

15. The method of claim 13, further including selecting and implementing a plurality of functions with said welding job sequencer.

16. The method of claim 15, wherein selecting and implementing the plurality of functions includes monitoring quality measurables of the assembly, wherein the quality measurables comprise at least information about an arc used to form a weld created by the operator.

17. The method of claim 15, wherein selecting and implementing the plurality of functions includes indicating information to the operator in the semi-automatic welding work cell.

18. The method of claim 15, wherein selecting and implementing the plurality of functions includes accepting job information comprising at least a part ID number, operator ID number, or welding instructions.

19. The method of claim 15, wherein selecting and implementing the plurality of functions includes producing a job report comprising at least one of a number of welds preformed, total arc time, individual arc time, sequence interruptions, errors, faults, wire usage, arc data.

20. The method of claim 15, wherein selecting and implementing the plurality of functions includes a system check of said at least one semi-automatic welding work cell, the system check comprising at least a detection of wire supply, gas supply, and time.

* * * * *